United States Patent
Slicker et al.

(10) Patent No.: US 8,324,519 B2
(45) Date of Patent: Dec. 4, 2012

(54) MEMS SWITCH WITH LATCH MECHANISM

(75) Inventors: James Melvin Slicker, West Bloomfield, MI (US); Hongwei Qu, Rochester Hills, MI (US)

(73) Assignees: Microstar Technologies LLC, West Bloomfield, MI (US); Oakland University, Rochester, MI (US)

( * ) Notice: Subject to any disclaimer, the term of this patent is extended or adjusted under 35 U.S.C. 154(b) by 0 days.

(21) Appl. No.: 13/375,406

(22) PCT Filed: Jun. 7, 2010

(86) PCT No.: PCT/US2010/037618
§ 371 (c)(1), (2), (4) Date: Nov. 30, 2011

(87) PCT Pub. No.: WO2010/141942
PCT Pub. Date: Dec. 9, 2010

(65) Prior Publication Data
US 2012/0067709 A1  Mar. 22, 2012

Related U.S. Application Data

(60) Provisional application No. 61/217,811, filed on Jun. 5, 2009.

(51) Int. Cl.
*H01H 1/52* (2006.01)
(52) U.S. Cl. .................................................. 200/318
(58) Field of Classification Search .............. 200/318, 200/181, 61.45 R–61.53; 335/78
See application file for complete search history.

(56) References Cited

U.S. PATENT DOCUMENTS

| | | | |
|---|---|---|---|
| 7,371,982 B2 * | 5/2008 | Greywall | 200/61.45 R |
| 7,893,799 B1 * | 2/2011 | Slicker et al. | 335/78 |
| 8,115,576 B2 * | 2/2012 | Lu et al. | 335/78 |
| 2002/0000364 A1 | 1/2002 | Hong et al. | |
| 2003/0033703 A1 | 2/2003 | Amatucci et al. | |

FOREIGN PATENT DOCUMENTS

EP  2045645 A1  4/2009

OTHER PUBLICATIONS

Korean Intellectual Property Office; International Search Report and Written Opinion from counterpart PCT Application PCT/US2010/037618. Date of Mailing: Jan. 17, 2011.

R.R.A. Syms; H. Zou; J. Stagg; Robust latching MEMS translation stages for micro-optical systems; Journal of Micromechanics and Microengineering, Mar. 17, 2004, pp. 667-674, Institute of Physics Publishing, UK, (J. Micromech. Microeng. 14 (2004) 667-674).

* cited by examiner

*Primary Examiner* — Edwin A. Leon
(74) *Attorney, Agent, or Firm* — Dykema Gossett PLLC

(57) ABSTRACT

A MEMS switch includes a latch mechanism, first and second electrical conductors, a first latch actuator, a second latch actuator, and an axial actuator. The latch mechanism may include a transfer rod and a contact member, the contact member extending radially outwardly from a position along the axial length of the transfer rod. The first and second electrical conductors may extend along, and may be radially offset from, a portion of the transfer rod. The first latch actuator may include a first latch pin, and the second latch actuator may include a second latch pin, the first and second latch actuators being configured to move toward and away from the transfer rod, and the first and second latch pins configured to engage the contact member. The at least one axial actuator may be configured to move the contact member towards and away from the first and second electrical conductors.

16 Claims, 9 Drawing Sheets

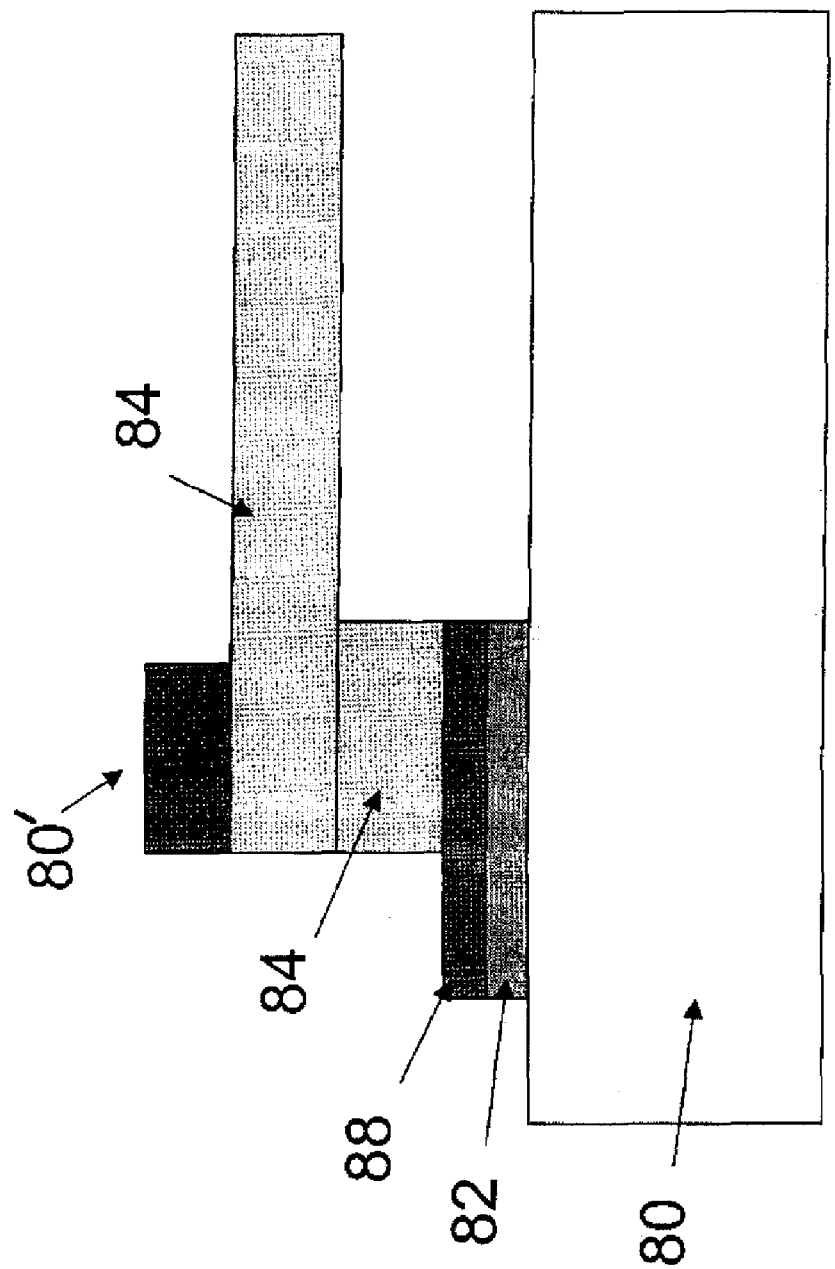

MEMS SWITCH WITH LATCH MECHANISM

CROSS REFERENCE TO RELATED APPLICATIONS

This application is a national stage filing based upon International PCT Application No. PCT/US2010/037618, with an international filing date of Jun. 7, 2010, which claims the benefit of the filing date of U.S. provisional application No. 61/217,811, filed Jun. 5, 2009, the entirety of which is incorporated by reference as though fully set forth herein.

TECHNICAL FIELD

This invention generally relates to micro-electro-mechanical system (MEMS) devices, including micro switches and technologies such as electro-thermal actuated MEMS latch devices that can hold or retain a contactor in an open or closed state without power being applied.

BACKGROUND

Microelectromechanical systems (MEMS) have recently been developed as alternatives for conventional electromechanical devices such as switches, actuators, valves, and sensors. MEMS are commonly made up of components between 10 to 100 micrometers in size (i.e. 0.01 to 0.1 mm) and some MEMS devices may range in size from 20 micrometer (20 millionth of a meter) up to a millimeter (thousandth of a meter). MEMS devices are potentially low cost devices due to the use of microelectronic fabrication techniques. New functionality and low power consumption may also be provided because MEMS devices can be much smaller than conventional electromechanical devices.

There are needs for MEMS switches that can generate a relatively high contact force for switching signal lines carrying relatively high power. There is also a need to provide a MEMS switch that can remain in an open or closed state without requiring input electrical power to hold or maintain it in that state.

For some applications, it may be desirable to provide a MEMS actuator that is capable of moving a MEMS latch device to an open state while generating relatively high force and retaining the latch in plane while it moves. Some other actuation techniques have been employed in connection with MEMS actuator design. In MEMS switches, electrostatic and electromagnetic devices normally provide fast switching speeds. Electrostatically actuated switches however can require significantly large voltage levels yet only deliver small displacement and small force levels. Electromagnetic switches can often require large actuation power and difficult fabrication processes due to the material compatibility issues with other conventional MEMS materials such as silicon. It is desirable to provide a MEMS switch that can address or mitigate some or all of the foregoing constraints.

Another potential challenge with current MEMS devices is that the mechanisms that generate force and movement often tend to move out of the plane of desired direction of travel. It would improve device efficiency if there was a method that could restrict the out-of-plane displacement without affecting the in plane movement of the device.

SUMMARY

The disclosed electro-mechanical/thermal MEMS switch employs a latching mechanism that may be configured to hold or retain a contactor in an open or closed position without requiring the application of electrical power to hold or retain the contactor in that position. The disclosed MEMS switch employs actuators that may be electro-thermal and can be fabricated, for example and without limitation, using fabrication techniques called PolyMUMPs or MetalMUMPS such as used by the MEMSCAP company. Actuators provided in accordance with the disclosed actuator design may be referred to as a "V-shape actuator," and can provide for high actuation forces while the device generally remains in-plane. For instance, as discussed in the instant disclosure, such actuators may be employed to move a contactor into a closed state, but may also be employed to move a contactor into an open state. A spring force can be provided to return the contactor to the opposite state. In embodiments, actuators may be used to pull at least one latch pin away from the contactor when it is desired to move the contactor to the other state (open or closed). It is recognized that features associated with other types of MEMS actuators may be utilized to pull the latch pin(s) and/or move the contactor into another state. In an embodiment, the actuation can be sequenced, and a programmable switch can be actuated and latched to "on" and "off" states whether or not actuator power is removed at the end of the sequence. Design requirements such as the magnitude of contact force, reliable alignment of the electrical contacts, and reduced out-of-plane displacement can be realized employing teachings of this disclosure. In embodiments, a device to prevent warping or twisting of the electro-thermal actuators may comprise, for example, a post mounted to a substrate above the latch pin to prevent sideway movement when holding the contactor in position. Electro-thermal MEMS actuators may have many applications because of their capability of producing large forces and relatively long travel. Moreover, by selecting a suitable material (by way of example, without limitation, a metal as used in Metal-MUMPS technology), a lower actuation voltage may be possible.

BRIEF DESCRIPTION OF THE DRAWINGS

FIG. 11A shows a cross-sectional view of an alternative embodiment of a MEMS device with a sacrificial layer(s) removed or etched away;

DETAILED DESCRIPTION

Reference will now be made in detail to embodiments of the disclosure, examples of which are described herein and illustrated in the accompanying drawings. While the inventive concepts will be described in conjunction with embodiments, it will be understood that they are not intended to limit the invention to these embodiments. On the contrary, the invention is intended to cover alternatives, modifications and equivalents, which may be included within the spirit and scope of the invention.

Figure 1:
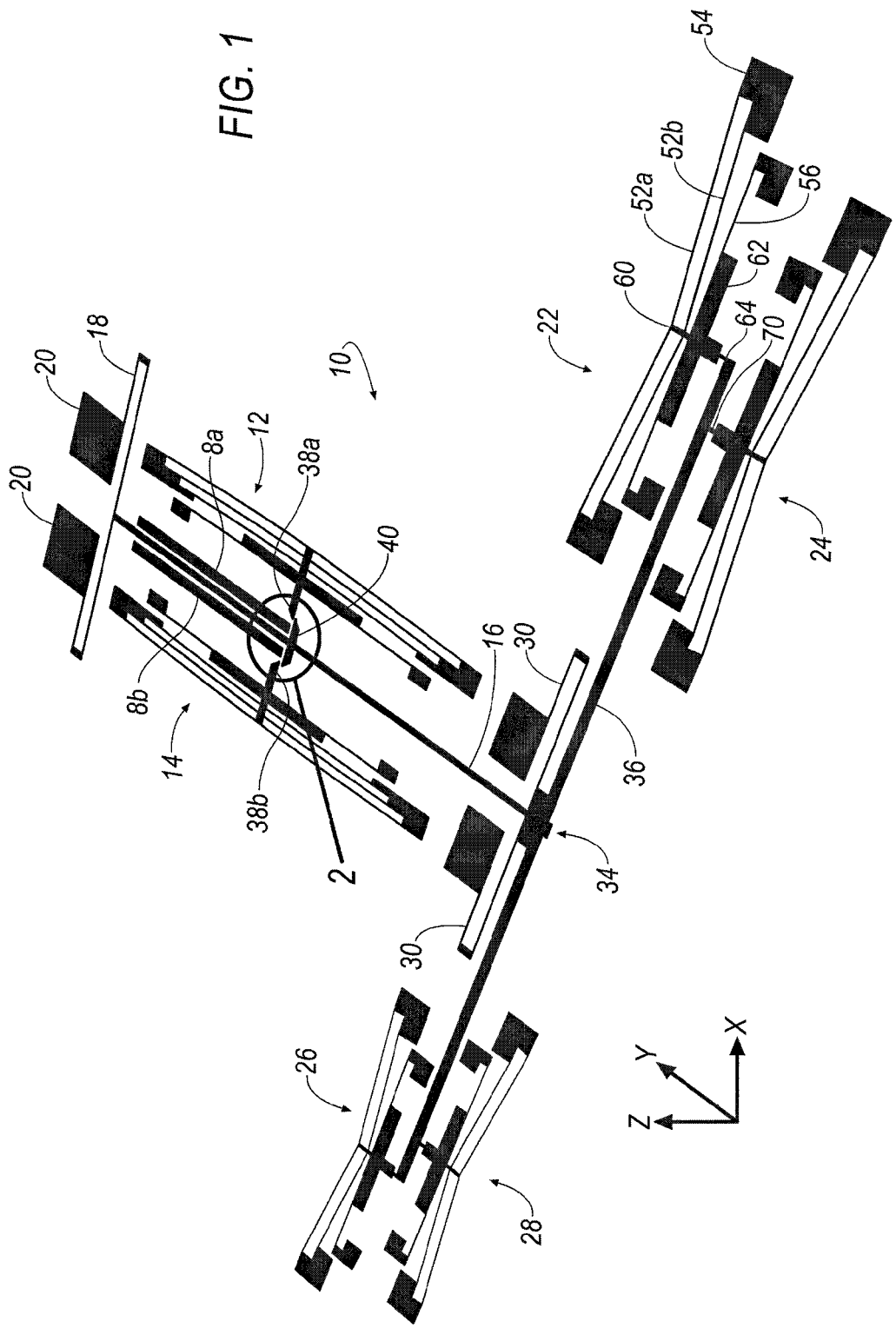
FIG. 1 shows a perspective view of an embodiment of a MEMS switch device including a MEMS latch mechanism and a plurality of electro-thermal actuators.

Referring to FIG. 1 of the drawings, a perspective view of an embodiment of a MEMS switch 10 is shown including a latch switch mechanism 2, which is described in more detail with reference to FIGS. 2-5. The latch mechanism 2 may be configured to function in a manner that allows electrical power to be removed from latch actuators 12 and 14 and from axial actuators 22, 24, 26 and 28 when the latch switch mechanism 2 is either in an open state or in a closed state. An "open" state may be said to occur when conductors (which may also be referred to as electrical contacts) 8a and 8b are electrically isolated. A "closed" state may be said to occur when the electrical conductors 8a and 8b are electrically shorted—such as via contactors 15 provided on a lateral contact member 40.

In embodiments, latch actuators 12 and 14 may be electrically energized when it is desired to actuate a corresponding latch switch mechanism 2. After the latch actuators 12 and 14 have energized the latch switch mechanism 2, such as by pulling latch pins 38a and 38b away from an interposed contactor 15 that may be attached or connected to contact member 40, one or more axial actuators (e.g., illustrated axial actuators 22, 24, 26 and 28) may be energized and may act to move the contactor 15 (vis-à-vis a transfer rod 16) towards two or more conductors 8a and 8b. In embodiments, the contactor 15 may be moved to the point in which associated conductors 8a and 8b are shorted together by the contactor 15. Thereafter, the electrical current to the latch actuators 12 and 14 may be removed, and the latch actuators 12 and 14, along with attached latch pins 38a and 38b, may be moved back into non-energized positions, thereby latching the contactor 15 into a closed position in which associated latch pins 38a and 38b may engage the contactor 15 and hold or retain the contactor 15 in a closed position.

When it is desired to open the conductors 8a and 8b, electrical power may first be applied to the latch actuators 12 and 14, which in turn may pull the latch pins 38a and 38b away from the contactor 15. Springs 18 and 30 can be configured (e.g., pre-loaded) to push and pull, respectively, an associated transfer rod 16 in a direction to cause the contactor 15, which may be attached to the transfer rod 16 via contact member 40, to open conductors 38a and 38b.

A plane spring 34 may be provided, and can be oriented to hold the transfer rod 16 and an amplification link 36 in position in a plane (e.g., the illustrated Z plane). Such a plane spring 34 can be configured to prevent the transfer rod 16 and the amplification link 36 from lifting away from the desired direction of travel along an associated Y-axis and thereby lowering the efficiency of the MEMS switch 10. In the art, this may be referred to as moving "out of plane."

Figure 2:
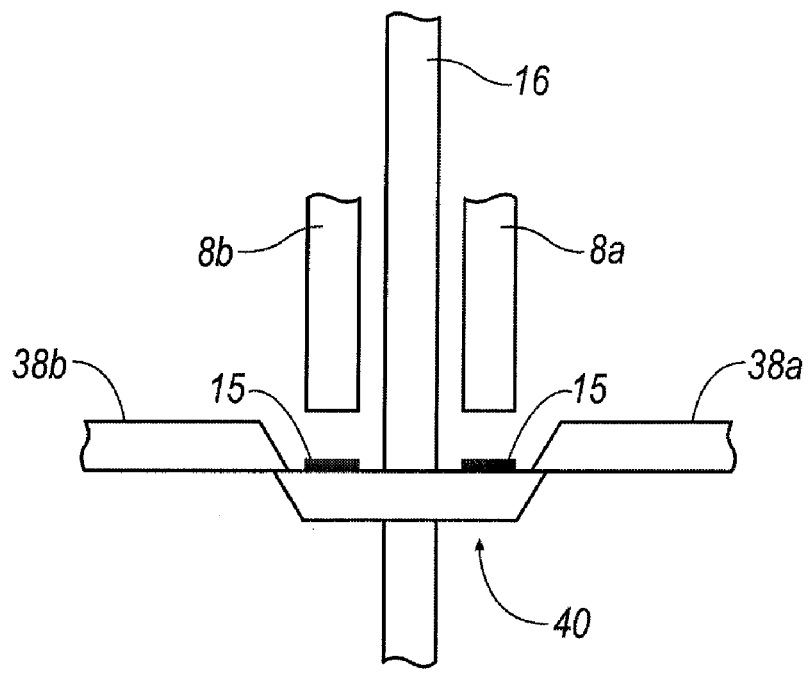
FIG. 2 shows a plan view of an embodiment of a MEMS latch mechanism shown in an open state.

Now referring to FIGS. 2-5 of the drawings, cross-sectional views of an embodiment of a latch switch mechanism 2 are shown in various states of activation. FIG. 2 illustrates an embodiment of a latch switch mechanism 2 in a latched position with a contactor 15 separated (e.g., vertically disposed) from associated conductors (or signal lines) 8a, 8b. In the illustrated embodiment, the latch switch mechanism 2 may be said to be in an open position. In such a configuration, no electrical current has generally been applied to the latch actuators 12, 14 or to associated axial actuators (e.g., axial actuators 22, 24, 26 and 28).

Figure 3:
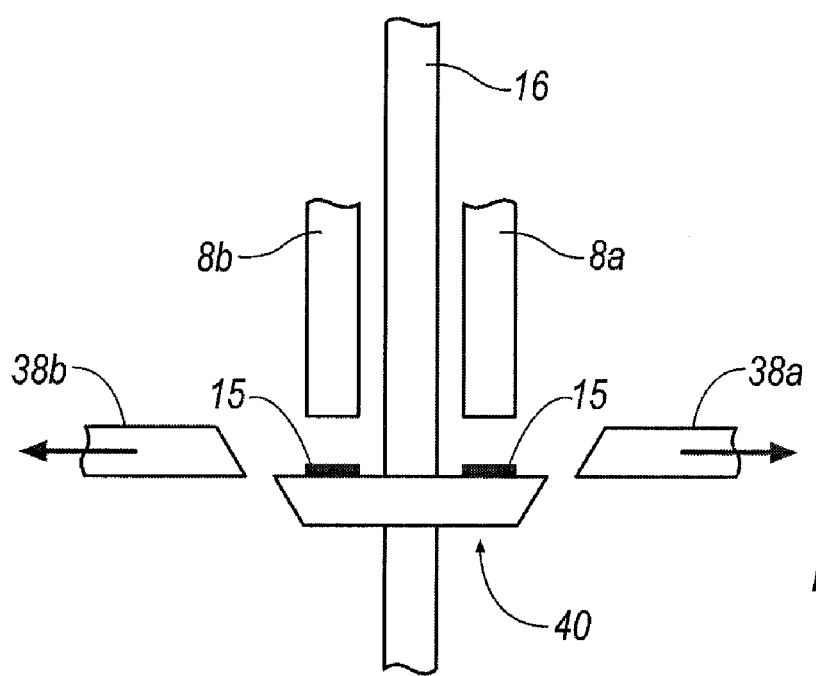
FIG. 3 shows a plan view of the MEMS latch mechanism of the type generally illustrated in FIG. 2 with the MEMS latch mechanism shown in an open state transitioning to a closed state.
Figure 4:
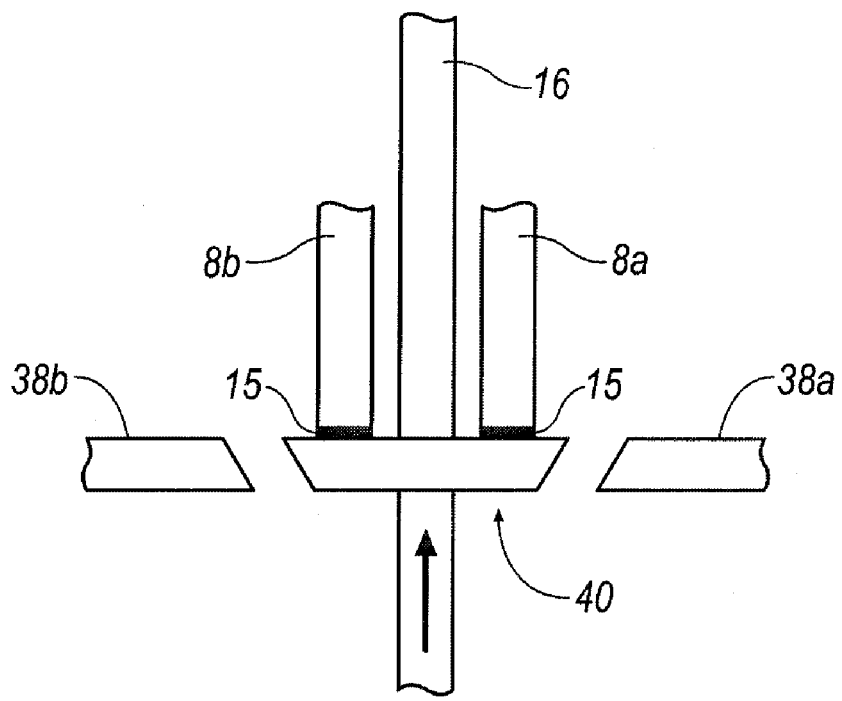
FIG. 4 shows the plan view of the MEMS latch mechanism of the type generally illustrated in FIG. 2 with the MEMS latch mechanism shown in a closed state but unlatched.

FIG. 3 generally illustrates the latch switch mechanism 2 where an electrical current has been applied to associated latch actuators 12 and 14 (see e.g., FIG. 1) resulting in the urging or pulling of respective latch pins 38a and 38b away from the contactor 15, thereby allowing the contactor to be moved by forces (e.g., associated with springs 18 and 30) towards the conductors 8a and 8b. Now referring to FIG. 4, the latch switch mechanism 2 is shown as the contactor 15 has moved to make electrical contact with the conductors 8a and 8b, causing the MEMS switch 10 to be switched from an open to a closed state. To axially move the contactor 15 towards the conductors 8a and 8b, electrical current is supplied to axial actuators (e.g., illustrated axial actuators 22, 24, 26 and 28) which causes a force to be generated by the axial actuators on an amplification (or closing) link 36, resulting in the amplification link 36 axially moving the transfer rod 16 and the contactor 15 (attached or connected to the transfer rod 16 via contact member 40) towards the closed position. In embodiments, portions (e.g., radially outward ends) of the contact member 40, where contactors 15 are attached or connected, may be configured to connect or interconnect with ends of respective latch pins (e.g., radially inward ends of 38a and 38b). For example and without limitation, in an embodiment, the respective ends of the contact member 40 and latch pins may be configured to include angular end surfaces that substantially complement each other. However, the invention is not limited to the illustrated interconnecting configurations, and other forms of interconnection are contemplated.

Figure 5:
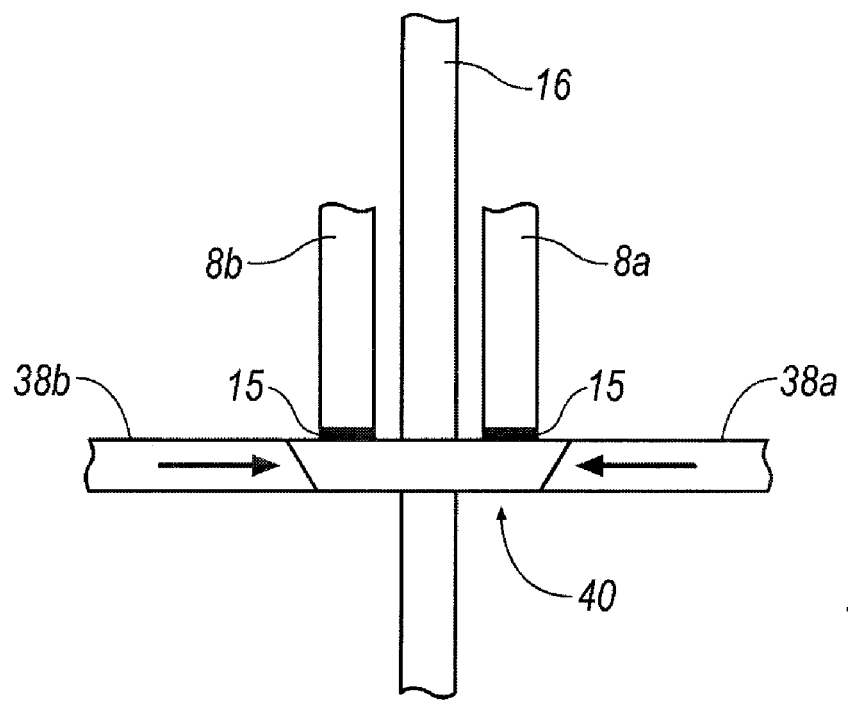
FIG. 5 shows the plan view of the MEMS latch mechanism of the type generally illustrated in FIG. 2 with the MEMS latch mechanism shown in a closed state and latched.

After the contactor 15 makes electrical contact with the conductors 8a and 8b, the latch pins 38a and 38b may be permitted to move back inwardly towards the contactor 15 when the electrical current is removed from the latch actuators 12 and 14. An embodiment of a "closed and latched" state is illustrated in FIG. 5. In this state, the current is generally removed from both the latch actuators 12, 14 and the axial actuators (e.g., axial actuators 22, 24, 26 and 28), and the latch switch mechanism 2 may generally be retained or held in a closed state without the consumption of additional electrical power.

When it is desired to move the latch switch mechanism 2 back into an open state, electrical current may be supplied to the latch actuators 12 and 14, and the latch pins 38a, 38b may be moved away from the contactor 15 by force(s) generated by one or more latch actuators (e.g., latch actuators 12 and 14). Springs 18 and 30 can be configured and oriented to move the transfer rod 16 and the connected or attached contactor 15 away from the conductors 8a and 8b. The electrical current may then be removed from the latch actuators 12 and 14, and the latch switch mechanism 2 may then return to a state such as shown in FIG. 2—wherein the MEMS switch 10 is again in an open state with essentially no conductivity between the conductors 8a and 8b. Additional conductors can be included and employed in a similar manner.

Figure 6:
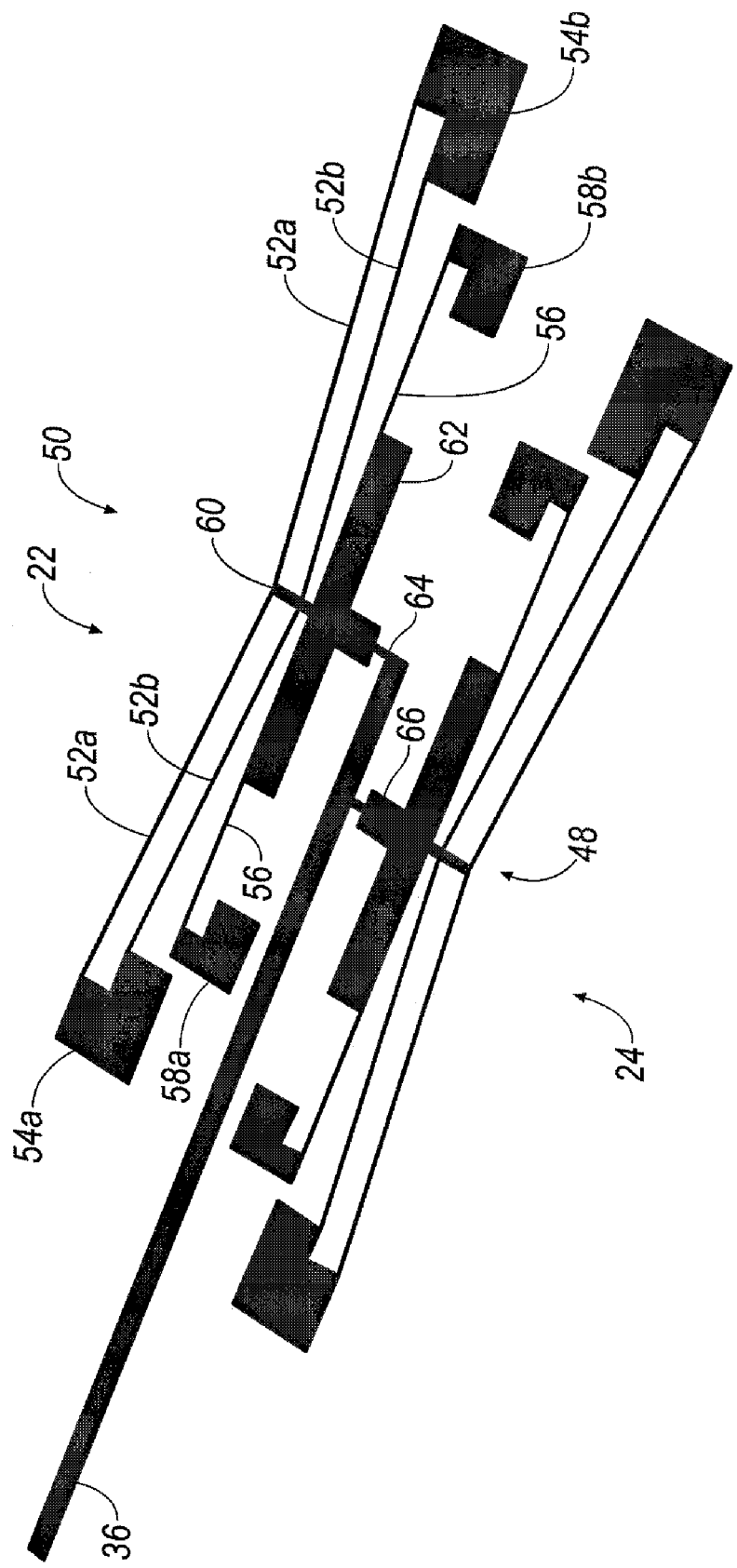
FIG. 6 shows a plan view of an embodiment of an electro-thermal actuator connected to a displacement amplification beam.

Now referring to FIG. 6, a perspective view of an embodiment of a pair of axial actuators 50—including axial actuators 22 and 24—is generally shown. Axial actuator 24 may be configured substantially as a mirror image of axial actuator 22 and, given the orientation, axial actuator 24 may move in an opposite direction to that of actuator 22 when an electrical current is applied to each. When such an electrical current is supplied, the result may be an axial motion of an amplification link 36 (resulting in an axial movement of transfer rod 16 and contactors 15). The relative spacing of actuators 22 and 24 compared to the length of amplification link 36, can be configured to result in a larger (or amplified) displacement of the distal end of the amplification link 36 as compared to a relatively small displacement of actuators 22 and 24. Embodiments of such a motion may, for instance, be the result of a unique configuration/nature of the axial actuators. For example, without limitation axial actuators 22, 24, 26, 28 may utilize a "Chevron Beam" actuator and a cold and hot beam actuator with unequal length hot beams in each actuator. For a further understanding of how a MEMS switch 10 may be fabricated, one may refer to "PolyMUMPs Design Handbook, Rev. 11.0" by Carter, Cowen, Hardy, Mahadevan, Stonefield and Wilcenski, and "Metal MUMPs Design Handbook, Rev. 2.0 by Cowen, Mahadevan, Johnson and Hasly, both from MEMSCAP Company. To further understand how the latch actuators (e.g., latch actuators 12 and 14) and the axial actuators (e.g., axial actuators 22, 24, 26, 28) may be configured to operate, one may refer to the paper "Design and Fabrication of a Low Power Electro-thermal V-shape Actuator With Large Displacement" by Khazaai, Haris, Qu and Slicker as published by Oakland University.

With further reference to FIG. 6, two hot beams 52a and 52b may be used with an associated axial actuator 50. Actuator 50 may be generally illustrative of any or all of the actuators of the MEMS switch 10, including, for instance, latch actuators 12 and 14, and axial actuators 22, 24, 26 and 28. As generally illustrated, two hot beams 52a and 52b may be attached or connected at or about their respective centers, and may be attached to a joint link pin 60, which in turn may be connected or attached to a central base 62. If the central base 62 is considered part of the hot beam/arm, the center piece on actuator 50 (which is the counterpart of 66 in the other side actuator (actuator 22). The hot beams 52a and 52b may be attached at one end to an end support 54a and at an opposite ends to another end support 54b. As generally shown, a cold beam comprising 56 may be provided, and may also include end supports 58a and 58b. In an embodiment, the cold beam can be attached to a central base 62 (which may have a different (e.g., increased) width), and the central base 62 may, in turn, be connected or attached to the joint link pin 60. The central base 62 can also be attached to an amplification link 36 via a link pin 64 (see, e.g., FIG. 1). In embodiments, a complementary axial actuator 24 may be provided and coordinated with opposed axial actuator 24, axial actuator 24 may be attached or connected to a common amplification beam 36 at an offset location (with respect to link pin 64) via link pin 66.

Additionally, with respect to the connections between the two pieces of the polysilicon structure 84 in the embodiments shown in FIG. 5 and FIG. 6, the lower portions thereof, are may not necessarily be "inserted" into the upper portions as generally illustrated. Rather, such pieces may be "stacked" with a substantially flat interface.

It is noted that the various actuators—including latch actuators 12, 14, and axial actuators 22, 24, 26 and 28—may be made in a substantially similar fashion, and the actuators can be configured to generally function in similar manners. The concept, however, contemplates that other known types of actuators may be used to supply a needed or similarly desired operation or motion. By way of example, without limitation, electrostatic and other electrothermal types and bimetal actuators may be used in conjunction with a latch switch mechanism, including a latch switch mechanism 2 of the types shown.

In embodiments, including those generally illustrated, the associated hot and cold beams may not be configured such that the respective beams are parallel. Further, the hot beams of the latch actuators 12, 14 may be configured in a pre-loaded condition to, among other things, supply a spring like force to the latch pins 38a, 38b, which may urge or force them inwardly to latch the contactor 15 in either a closed or open state without necessitating the application or consumption of electrical power. The two opposed "U-shaped" actuators 46 and 48 of the actuator pair 50, such as generally illustrated, may provide for improved in-plane travel and permit the generation of larger forces and increased displacement with application of the same level of electrical current as supplied to conventional MEMS actuators. This improved operational performance may be achieved, in part, through the use of polysilicon for the actuator beams and fabrication of the MEMS switch 10 using a process known as PolyMUMPs. The MUMPs fabrication process may, for example, follow that described in a publication entitled "PolyMUMPs Design Handbook Rev. 13.0," as previously cited. However, it is contemplated that other known materials such as nickel may be used for various parts of the MEMS switch 10, and that other known fabrication processes, such as MetalMUMPs technology, may be utilized to provide desired results.

Figure 7:
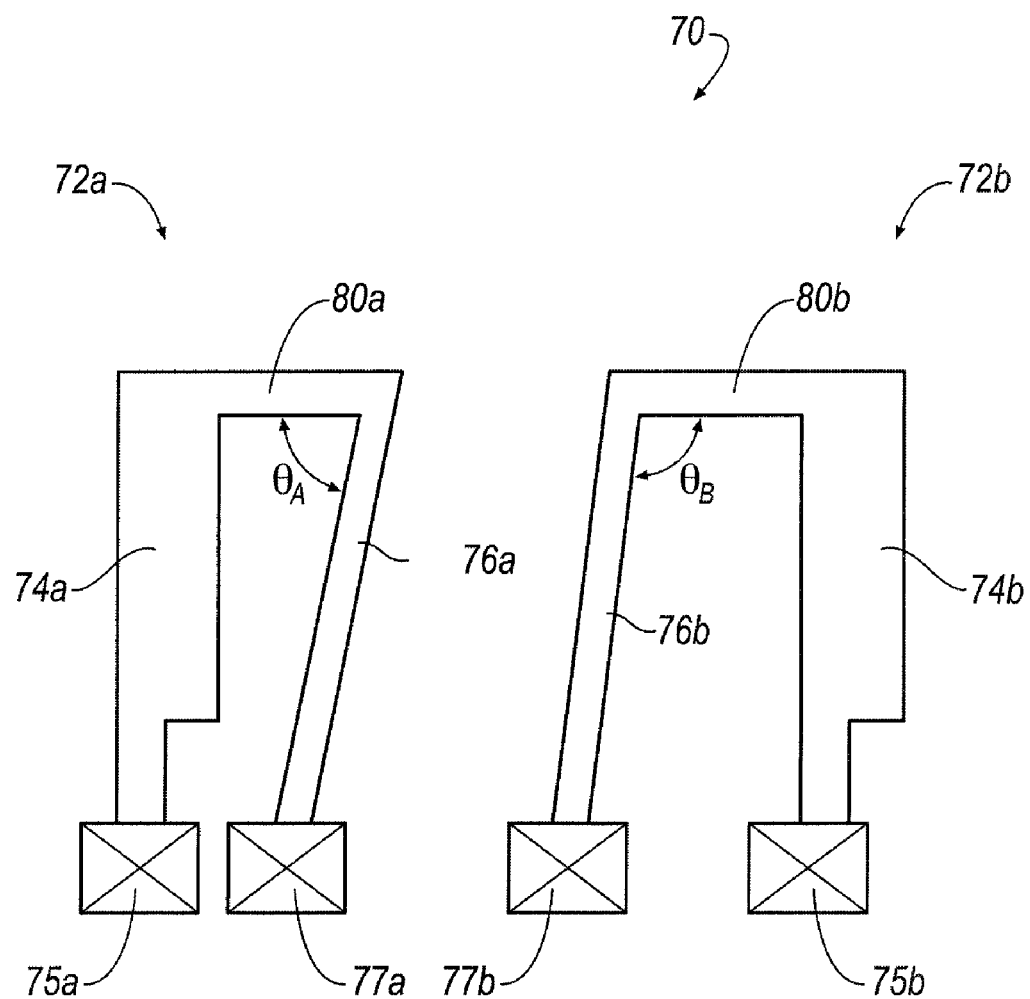
FIG. 7 shows a plan view of an embodiment of components of V-shaped electro-thermal actuators.

Turning to FIG. 7, a plan view of an embodiment of a V-shaped actuator for a MEMS switch is shown. The V-shaped actuator 70 of the illustrated embodiment includes two modified "U-shaped" actuators 72a, 72b, which may function as a pair, and which may be uniquely connected or linked to form a V-shaped actuator 70 if mirrored. As illustrated, wide beams (arms) 74a, 74b may be respectively connected to narrow beams (or narrow/hot arms) 76a, 76b and a relative angle $\theta_A$, $\theta_B$ may be formed between the respective link arms 80a and 80b and the wide arms 74a and 74b, respectively. The non-perpendicular geometry between the hot arms 76a and 76b can not only help ensure a desired in-plane direction of movement of the hot arms 76a and 76b, but can also serve to increase overall travel, particularly as compared to conventional MEMS devices. The angles $\theta_A$ and $\theta_B$, and the difference in length between two or more hot beams (see e.g., FIG. 6), may help optimize a design and/or a level of performance.

Now referring once again to FIG. 1, axial actuators 22, 24, 26 and 28 may be arranged in opposed pairs. For example, axial actuators 22 and 24 may geometrically oppose one another and may generate a motion in opposite directions upon the application of electrical current. In a similar fashion, axial actuators 26 and 28 may oppose one another's direction of travel when an electrical current is applied across the hot beams of the actuators. For example, considering axial actuator 22, an electrical current may cause hot beams 52a and 52b to expand and force a connecting pin 64 forward towards an amplification link 36. In a like fashion, axial actuator 24 may move with the application of electrical current and apply a forward force through link pin 70 to the amplification link 36. Since the positions of link pins 64 and 70 may be displaced with respect to one another along the amplification link 36, a moment torque can be introduced on the amplification link 36, and may result in a much greater displacement at the center of the amplification link 36—e.g., at or about where the transfer rod 16 is attached to the amplification link 36—as compared to the displacement of axial actuator 22 or 24 individually.

Referring to FIGS. 8-11, illustrative cross-sectional drawings of the fabrication process are shown. This process is sometimes referred to in the art as a PolyMUMPs foundry service, such as provided by the MEMSCAP company. A more detailed description of such a fabrication process can be found, for instance, in a publication entitled "PolyMUMPs Design Handbook" v 11.0.

Figure 8:
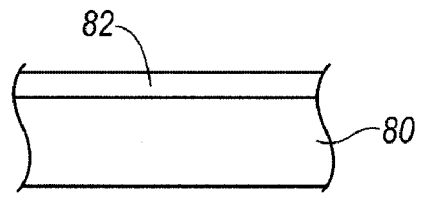
FIG. 8 shows a cross-sectional view of an embodiment of a MEMS device under fabrication with a substrate and an electrical isolation and anchor layer.

FIG. 8 illustrates a cross-sectional view of an embodiment of a MEMS device under fabrication, the device including a substrate and a coating (e.g., an isolation and anchor) layer. For example, with reference to the illustrated embodiment, a substrate 80, which may comprise a single crystal silicon layer, may be coated with a coating layer 82, which may comprise silicon nitrate (SiN). Such a coating layer 82 may provide one or more functions, including, for example, providing electrical isolation from the substrate, and/or providing a mechanical anchor to the substrate.

Figure 9:
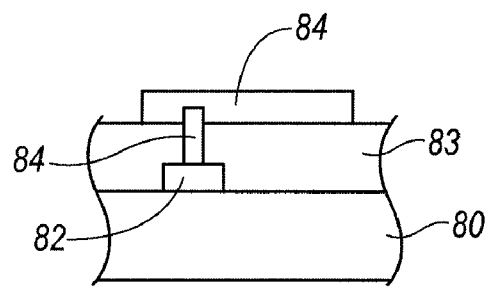
FIG. 9 shows a cross-sectional view of an embodiment of a MEMS device of the type illustrated in FIG. 8, including a substrate layer, a sacrificial layer, and a polysilicon microstructure (e.g., actuator beam)

FIG. 9 depicts a cross-sectional view of another embodiment of a MEMS device similar to that generally illustrated in FIG. 8. However, the instant embodiment includes a substrate layer and a polysilicon microstructure (e.g., an actuator beam). That is, as generally shown, a polysilicon structure 84 may make up an element of the MEMS switch 10 applied over a sacrificial layer 83, for example, silicon dioxide ($SiO_2$).

Figure 10:
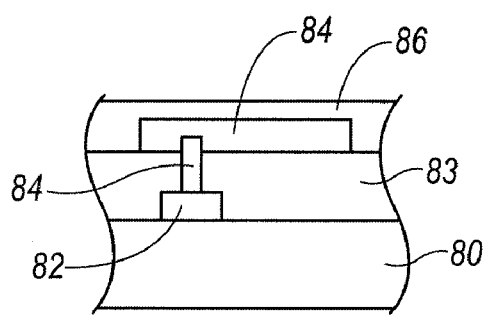
FIG. 10 shows a cross-sectional view of an embodiment of a MEMS device of the type generally illustrated in FIG. 9, including a layer covering the microstructure.

FIG. 10 shows a cross-sectional view of another embodiment of a MEMS device similar to that generally illustrated in FIG. 9 that includes a layer covering the microstructure, such as gold or aluminum. That is, as generally shown, a cover layer 86 may be added over the polysilicon structure 84 and over the sacrificial layer 83. The covering layer 86 can, among other things, provide for electrical connection with the polysilicon structure 84. Moreover, for a number of embodiments, it may be desirable to provide just a small length of covering layer 86 so that it does not surround the polysilicon structure 84.

Figure 11:
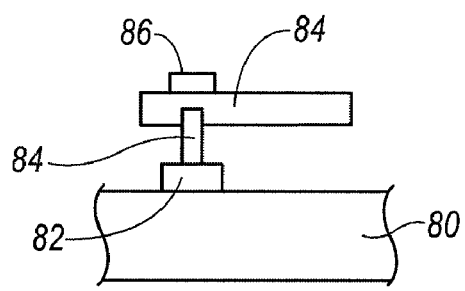
FIG. 11 shows the cross-sectional view of an embodiment of a MEMS device of the type generally illustrated in FIG. 10 with sacrificial layer(s) removed or etched away.

FIG. 11 illustrates a cross-sectional view of an embodiment of a MEMS device of the type generally illustrated in FIG. 10, but having selected layers removed or etched away. In an embodiment, for example, a sacrificial layer 83 may be largely removed, for instance, with a wet etching process thereby providing a functional MEMS device. In an embodiment, for example, remaining after the etch removal may be a small support pad 88 under a polysilicon structure 84 and an electrical contact pad 80 on the top surface of a polysilicon structure 84.

A cross-sectional view of another embodiment of a MEMS device is generally illustrated in FIG. 11A. In the instant embodiment, substrate 80 may be comprised of the same material as the cover layer 80'. It is noted that when a piece of metal is provided on a bonding pad, the element may be referred to as pad metal. With the instant illustration, the material of the support pad 88 may comprise the same material as the polysilicon structure 84; however, it is noted that the pad and structure may be formed in different/separate steps. Further, the support pad 88 may only be provided in portions where electrical signals may need to be applied to, or extracted from, the polysilicon structure 84.

Figure 12:
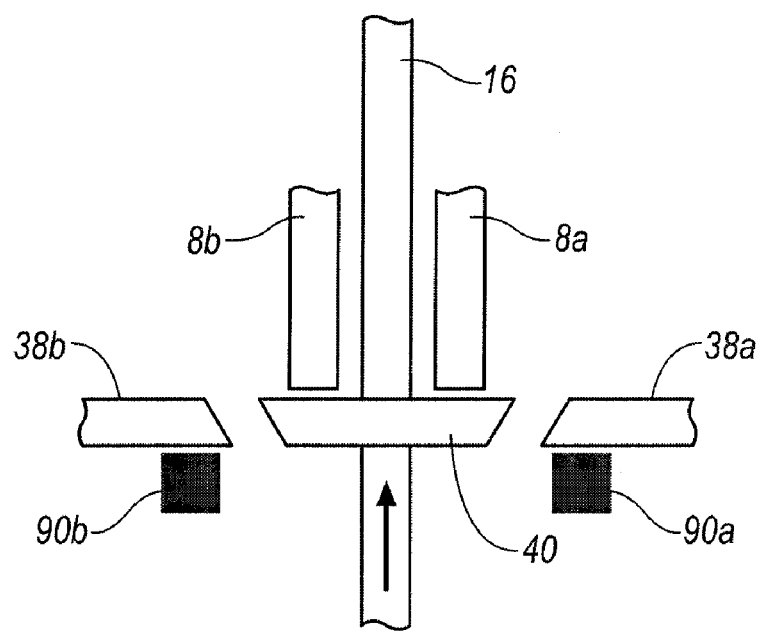
FIG. 12 shows a top plan view of an embodiment of a MEMS latch mechanism of the type generally illustrated in FIG. 4, including an installed post that can be configured to, inter alia, reduce in-plane twisting of latching actuators.
Figure 13:
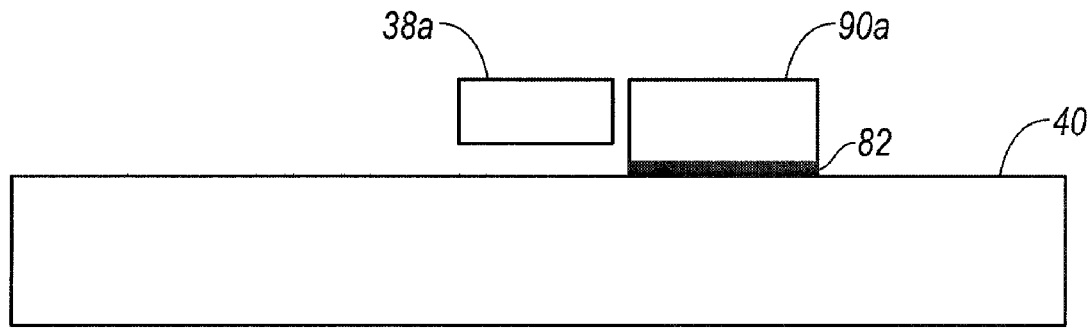
FIG. 13 shows a side plan view of an embodiment of a MEMS latch mechanism of the type generally illustrated in FIG. 12.

Now referring to FIG. 12, a top plan view of the latch mechanism (similar to that illustrated in FIG. 4) is shown having a pair of posts 90a and 90b. Post 90a may be configured to hold or retain latch pin 38a from deflecting laterally from a desired path of displacement or travel and twisting the latch actuator 12 when it is holding contactor 15 against conductors 8a and 8b. In a substantially similar manner, post 90b may be configured to prevent latch pin 38b from deflecting laterally and twisting the latch actuator structure 14 when it is holding contactor 15 against conductors 8a and 8b. FIG. 13 shows a side plan view of a latch mechanism of the type generally shown in FIG. 12 having a post 90a. In this side view, the structure of the posts 90a and 90b is more clearly shown. In the illustrated embodiment, the post 90a, may be connected or mounted to the substrate, for example, as shown in FIGS. 8-11. However, the inventive concept is not limited to the disclosed configurations, and various other configurations are contemplated that can serve or function to hold the moving structures of the MEMS switch 10 in a desired plane of travel.

Figure 14:
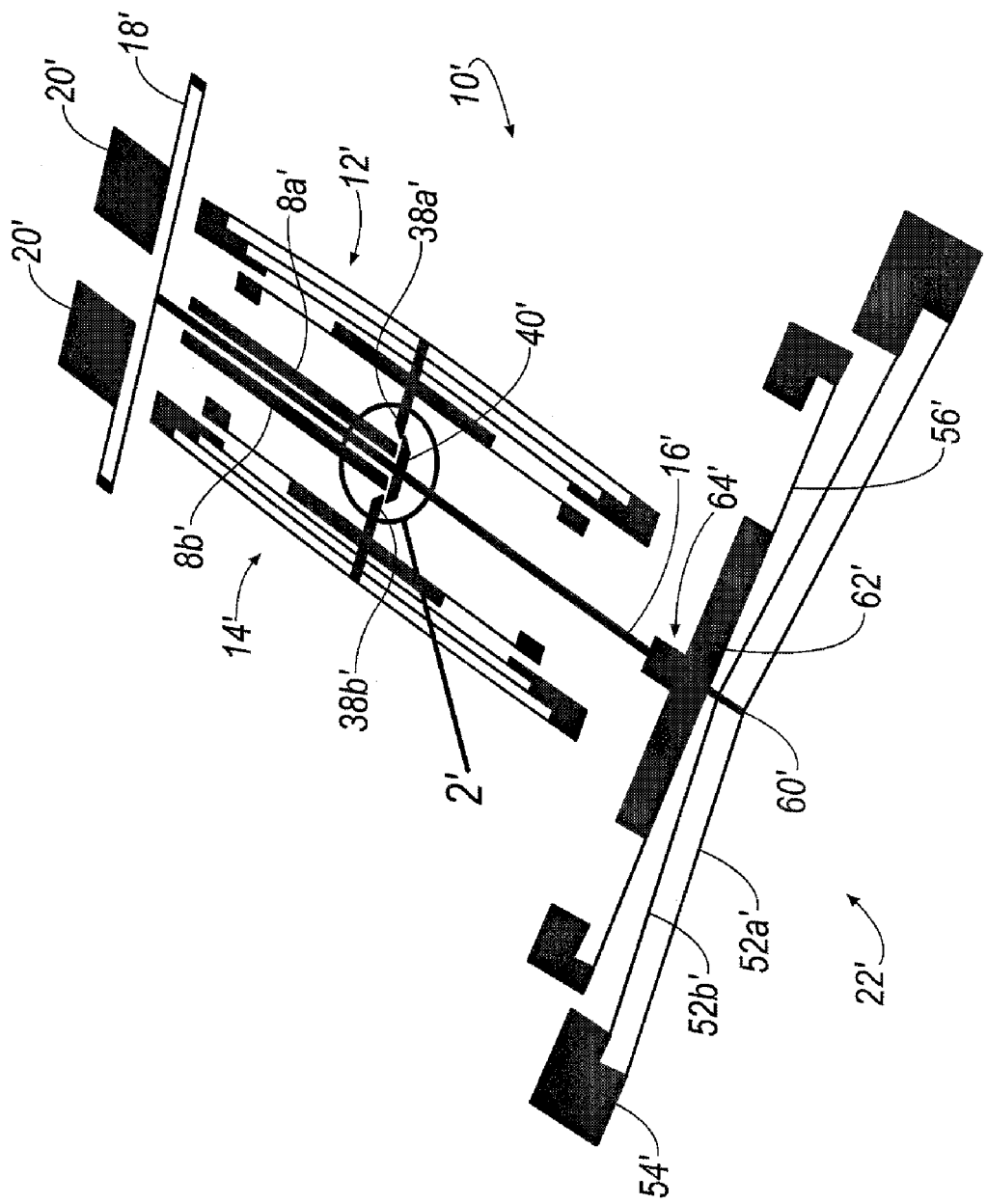
FIG. 14 shows a perspective view of an embodiment of a MEMS switch device, including a MEMS latch mechanism and an axial electro-thermal actuator that can generate an in-plane displacement.

Now referring to FIG. 14 of the drawings, a perspective view of another embodiment of a MEMS switch 10' is generally shown. This MEMS switch 10' may be substantially similar to the MEMS switch 10 shown in FIG. 1; however, axial actuators 24, 26 and 28 and amplification link 36 have been eliminated. In the illustrated embodiment, axial actuator 22' may be configured to provide sufficient actuation force and travel so that a "teeter-totter" arrangement of axial actuators (e.g., as shown with axial actuators 22, 24, 26 and 28 in FIG. 1) on the amplification link is no longer necessary to generate sufficient travel at the transfer rod 16' to operate the latch mechanism 2'. As generally shown, the amplification link 36 may be replaced with single actuator 22' that may provide similar functionality. However, since only one axial actuator 22' is employed, no moment is introduced at the transfer link's end sections. The axial actuator 22' may be configured to generate force in a direction to cause the contact member 40' to move and electrically short the conductors 8a' and 8b'. The axial actuator 22' may be configured to function substantially to electro-thermal V-shaped actuators, although other types of MEMS actuators may be provided to generate the required force and displacement to operate a latch mechanism 2' It is noted that the replacement of the displacement amplification arrangement of FIG. 1 by a single actuator 22' of FIG. 14 may be enabled by, for example, by a METAL-MUMPS process, which can allow for greater displacements than a POLYMUMPS process.

The illustrated MEMS switch 10' includes a latch switch mechanism 2' which may generally function as previously described in connection with FIGS. 2-5 and 12-13. The latch mechanism 2' functions in a manner that allow for electrical power to be removed from latch actuators 12' and 14' and from axial actuator 22' when the latch switch mechanism 2' is either in an open state or in a closed state. The open state may generally be defined as when the electrical contacts 8a' and 8b' are electrically isolated, and the closed state may generally be defined as when the electrical contacts 8a' and 8b' are electrically shorted.

The latch actuators 12' and 14' may be electrically energized when it is desired to actuate the latch switch mechanism 2'. After the latch actuators 12' and 14' have energized the latch switch mechanism 2' by pulling the latch pins 38a' and 38b' away from the contactor 15', the axial actuator 22' can be energized and act to move the contactor 15' (via a transfer rod 16') towards two or more conductors 8a' and 8b' until the conductors 8a' and 8b' are shorted together by the contactor 15'. Thereafter, the electrical current to the latch actuators 12' and 14' can be removed, and the latch actuators 12' and 14' (along with the attached latch pins 38a' and 38b') may move back into their non-energized positions, thereby latching the contactor 15' into a closed position where the latch pins 38a' and 38b' engage the contactor 15' and hold it in a closed position. Then power may be removed from actuator 22' after the contactor 15' is latched into place. It is noted that actuator 22' should be designed to have only sufficient force to move contact member 40' into position to be clamped by latch pins 38a' and 38b'. The actuator 22' ideally should not apply any excessive amount of force to the contact member 40' since the extra force may pull in the opposite direction when power is removed from actuator 22' after the latch pins 38a' and 38b' have clamped contact element 40' into place. The excessive force of actuator 22' may reduce the contact force applied by latch pins 38a' and 38b'. Alternatively a spring may be inserted between actuator 22' and transfer rod 16' to mitigate any extra force that may be supplied by actuator 22'.

When it is desired to open the conductors 8a' and 8b', the electrical power may first be applied to the latch actuators 12' and 14', which in turn pull the latch pins 38a' and 38b' away from the contactor 15'. Spring 18' can be pre-loaded to push respectively, the transfer rod 16' in a direction to cause the contactor 15', which is attached to the transfer rod 16', to open the conductors 38a' and 38b'.

In embodiments, a single V-shaped axial actuator (such as axial actuator 22') can be configured and optimized to provide minimal out-of-plane displacement, including upon actuation. Consequently a plane spring 34 in a "teeter-totter" configuration (such as illustrated in FIG. 1) may not be necessary. For instance, a center link 64' of an axial actuator 22' can be connected to a transfer rod 16 directly to provide an increased y-direction in-plane displacement.

Referring again to FIG. 14, the axial actuator 22' generates a motion upon the application of electrical current. For example, considering axial actuator 22', the electrical current causes the hot beams 52a' and 52b' to expand and force the connecting pin 64' forward towards transfer rod 16. This force and movement of actuator 22' is transferred to the transfer rod 16 and then to the contact member 40' to move towards the conductors 8a' and 8b', to contact and close the MEMS switch 10'. When it is desired to once again open the MEMS switch 10', the latch pins 38a' and 38b' may be moved away by latch actuators 12' and 14', where the springs 18' operating between the mounting pads 20' and on the transfer rod 16' may act to force the transfer rod 16' so that the contact member 40' is moved away from the conductors 8a' and 8b'. The MEMS switch 10' may once again be provided in an open position.

Although numerous embodiments of this invention have been described above with a certain degree of particularity, those skilled in the art could make numerous alterations to the disclosed embodiments without departing from the spirit or scope of this invention. It is intended that all matter contained in the above description or shown in the accompanying drawings shall be interpreted as illustrative only and not limiting. Changes in detail or structure may be made without departing from the spirit of the invention as defined in the appended claims.

What is claimed:

1. A MEMS switch comprising:
   a latch mechanism including a transfer rod and a contact member, the contact member extending radially outwardly from a position along the axial length of the transfer rod;
   first and second electrical conductors, the first and second electrical conductors extending along, and radially offset from, a portion of the transfer rod;
   a first latch actuator including a first latch pin, and a second latch actuator including a second latch pin, the first and second latch actuators configured to move toward and away from the transfer rod, and the first and second latch pins configured to engage the contact member;
   at least one axial actuator, the at least one axial actuator configured to move the contact member towards and away from the first and second electrical conductors.

2. The switch of claim 1, including at least one spring configured to move the transfer rod.

3. The switch of claim 1, including a first spring configured to move the transfer rod in a first direction, and a second spring configured to move the transfer rod in a second direction that substantially opposes the first direction.

4. The switch of claim 1, including an amplification link connected to the at least one axial actuator.

5. The switch of claim 4, wherein the amplification link is connected to a pair of axial actuators, the axial actuators configured to move in opposite directions.

6. The switch of claim 4, wherein the amplification link is in operative connection with two pairs of axial actuators, and wherein the relative spacing of each of the axial actuators of each pair of axial actuators along the length of the amplification link is configured to provide a leveraged amplification of the displacement of a distal end of the amplification link.

7. The switch of claim 1, wherein the at least one axial actuator includes two hot beams.

8. The switch of claim 7, wherein the two hot beams are attached or connected at or about their respective centers, and the two hot beams are attached to a joint link pin that is connected to a central base that is attached to a cold beam.

9. The switch of claim 4, including a plane spring, the plane spring configured to hold the transfer rod and the amplification link in-plane relative to each other.

10. The switch of claim 1, wherein, in a latched and open position, the contact member is connected to or interconnected with the first latch pin and the second latch pin, and the contact member is separated from the first and second electrical conductors.

11. The switch of claim 1, wherein, when an electrical current is applied to the first and second latch actuators, the first and second latch pins move away from the contact member, permitting the contact member to move towards the first and second electrical conductors.

12. The switch of claim 1, wherein, in a closed and unlatched position, the contact member is in contact with the first and second electrical conductors, and the contact member is separated from the first latch pin and the second latch pin.

13. The switch of claim 1, wherein, in a closed and latched position, the contact member is in contact with the first and second electrical conductors, and the contact member is connected to or interconnected with the first latch pin and the second latch pin.

14. The switch of claim 1, including one or more contactors attached or connected to the contact member.

15. The switch of claim 1, wherein the at least one axial actuator comprises a V-shaped actuator defined by two actuators that function as a pair.

16. The switch of claim 15, wherein one of the pair of actuators defining the V-shaped actuator includes a narrow beam and the other actuator includes a comparatively thicker beam.

* * * * *